Jan. 11, 1949.   J. DOUGHERTY   2,458,837
LUNCH CAN
Filed March 11, 1947

INVENTOR.
James Dougherty

Patented Jan. 11, 1949

2,458,837

UNITED STATES PATENT OFFICE 2,458,837

LUNCH CAN

James Dougherty, Silver Creek, Pa.

Application March 11, 1947, Serial No. 733,949

2 Claims. (Cl. 219—19)

This invention relates to lunch cans.

It is an object of the present invention to provide, with an ordinary lunch can, a socket into which a plug can be extended and a heating unit connected with the socket so as to supply heat to the lunch can to warm the same before it is to be opened and the contents consumed.

It is another object of the present invention to provide in a lunch can a means by which hot soup and the like can be supplied, as by a simple matter of making connection with an electrical source, to cause the heating element within the can to be energized and wherein the part of the can containing the soup can be withdrawn and placed upon a grill support to effect the heating of the hot soup and wherein this same grill support will serve to toast bread or sandwiches and thus wherein the worker can have a hot lunch and time will be saved in that the worker need not stand in line at a cafeteria for several minutes before obtaining hot food.

It is another object of the present invention to provide a grill in a lunch can which can be rotated to effect the elevation of toast and the removal of the same from the position over the heating element when the toast has been toasted and wherein this same grill will consume little space and may be positioned when not in use removed from the heating element such as to keep the contents in a part of the lunch can down and against being shaken.

It is another object of the present invention to provide a lunch can with heating devices therewithin which will be of simple construction, cheap to manufacture and efficient in operation.

For other objects and for a better understanding of the invention, reference may be had to the following detailed description taken in connection with the accompanying drawing, in which Fig. 1 is a longitudinal cross-sectional view of a lunch can showing the interior of the same.

Figure 1:
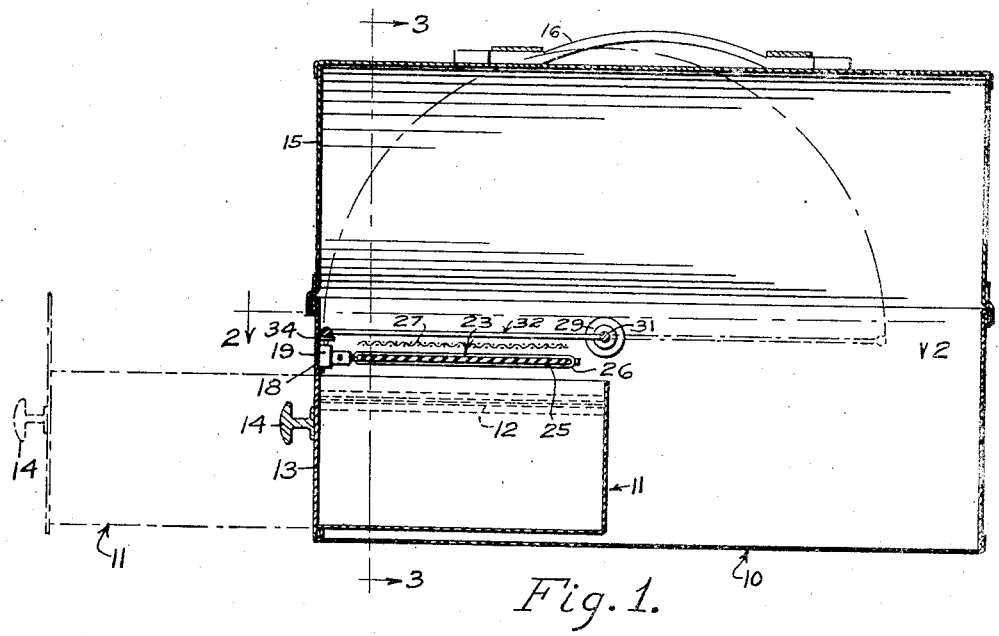

Referring now to the figures, 10 represents the main part of the can having the ordinary bottom and adapted to contain sandwiches and other food. In one end of the main container part 10 there is projected a drawer or container 11 adapted to contain soup or other liquids and operable upon guide ways 12 fixed to the interior of the sides of the container part 10 so as to retain the drawer 11 against vertical displacement. A front wall 13 is disposed upon the drawer and a handle 14 serves to effect the operation of the drawer to pull the same in or out. This drawer consumes only a part of the space within the main container part 10.

On the top of the main container part is the usual cover 15 adapted to house a thermos bottle if desired and which has a handle 16. The cover when in its down position will be locked with the top of the main container part 10 so that the main container part will be carried along therewith.

On the end wall portion as indicated at 18 and forming a part of the main container 10 and extending transversely across the opening through which the drawer 11 is pulled, is a socket 19 from which are extended leads 21 and 22 to a heating element 23 supported on the sides of the can by brackets 24. This heating element is constructed the same as ordinary heating elements with an insulating sheet 25 and with high resistance wires 26 extended over the same. Above the heating element there may be supported a screen 27 so that a more even heat will be distributed over the vessel or toast to be warmed. In the front wall 13 there are openings or slots 28 into which an electric plug can be extended to effect an electrical connection with the socket 19.

Figure 2:
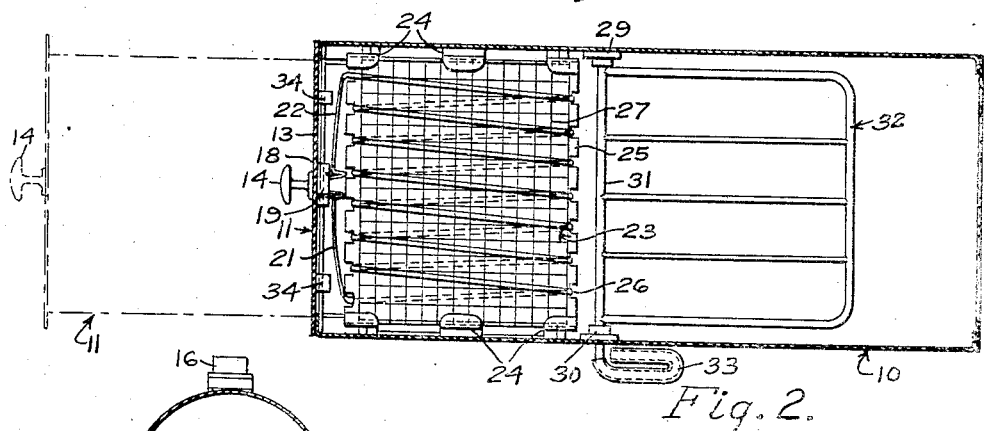
Fig. 2 is a transverse cross-sectional view taken on line 2—2 of Fig. 1 and looking in the direction of the arrows thereof and looking down upon the heating element, the screen thereabove and upon the grill which has been rotated to its out-of-use position.
Figure 3:
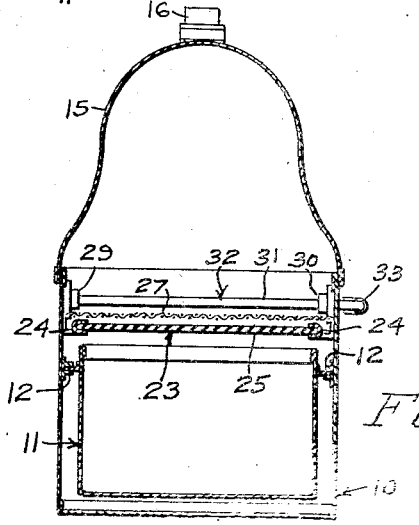
Fig. 3 is a cross-sectional and elevational view taken on line 3—3 of Fig. 1 and looking in the direction of the arrows thereof and through the heating screen and with the grill element turned to its out-of-use position.
Figure 4:
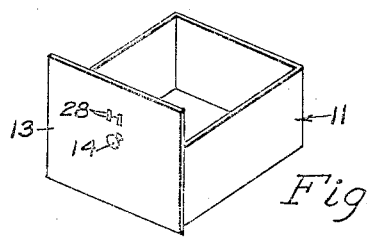
Fig. 4 is a perspective view of a compartment or drawer which has been removed from the front of the can and adapted to contain soup and to be placed upon the grill so as to be heated by the heating element.

Intermediate the length of the main container part 11 and on the side walls thereof there are mounted pivot bearing brackets 29 and 30 in which are journalled a transverse part 31 of a grill 32. The transverse part 31 extends through the side of the container to support a handle 33 by which the grill is manipulated or pivoted from a position as shown in Fig. 1 over the heating element or to a position shown in Fig. 2 where it is in an out-of-use location so far as its being used as a grill but where it will serve to keep any sandwiches or the like within the space in the main container part not consumed by the drawer 11, from shaking while the lunch can is being carried.

A projection 34 may support the grill when it is extended over the heating element 23. This projection may extend from the end wall portion 18 of the main container part 10. When the drawer 11 is in and the plug is extended through the slots 28 into the socket 19 the entire can will be heated. But when the drawer 11 has been removed and placed upon the grill, the contents of the drawer 11 which may be in the form of soup will be heated to a high degree of heat. The electrical plug will then enter the socket 19 directly. If the worker desires toast the bread is placed upon the grill and when the one side has been toasted he will manipulate the grill to remove the toast and dump it in the container part 10 where it can be easily picked up and returned to the grill for toasting on its other side. Little weight is added to the lunch can and the parts for providing the heat and the grill will consume little space within the lunch can.

Having now described my invention, I claim:

1. A lunch can comprising a main container part and a cover adapted to be extended over the same, said container part having an opening in one end, a drawer adapted to contain liquids or soup or the like slidable into the opening to consume part of the space within the main container part, an electrical socket connected to the end of the main container part above the drawer opening, a heating element having wires leading from the electrical socket and brackets for supporting the same above the drawer, a grill pivotally connected to the main container part between the side walls thereof and adapted to be extended over the heating element or pivoted to a position rearwardly of the same and serving when over the heating element to support the drawer which may have been removed from the main container part opening so that the contents of the same may be heated, said grill when not being used to support the drawer being adapted to be extended over the space within the main container part not consumed by the drawer to serve as a support or cover for any sandwiches or the like within the main container part to keep the same from shaking while the lunch can is being carried.

2. A lunch can as defined in claim 1 and said grill having a transverse member extending from one side of the main container part to and through the other side of the container part, and a handle formation on the extended part of the grill transverse member whereby the grill can be manipulated from a location exteriorly of the lunch can.

JAMES DOUGHERTY.

REFERENCES CITED

The following references are of record in the file of this patent:

UNITED STATES PATENTS

| Number | Name | Date |
| --- | --- | --- |
| 1,182,434 | Truitt | May 9, 1916 |
| 1,751,219 | Seamon | Mar. 18, 1930 |
| 2,187,196 | Douglass | Jan. 16, 1940 |
| 2,274,285 | Walker | Feb. 24, 1942 |
| 2,295,221 | King | Sept. 8, 1942 |
| 2,321,703 | Rivard | June 15, 1943 |